United States Patent
Ohmayer

(10) Patent No.: US 7,730,778 B2
(45) Date of Patent: Jun. 8, 2010

(54) FILLING LEVEL AND/OR LIMIT LEVEL MEASURING DEVICE WITH FLEXIBLE CONNECTING PIECE

(75) Inventor: Gerd Ohmayer, Haslach i. K. (DE)

(73) Assignee: Vega Grieshaber KG, Wolfach (DE)

(*) Notice: Subject to any disclaimer, the term of this patent is extended or adjusted under 35 U.S.C. 154(b) by 463 days.

(21) Appl. No.: 11/544,637

(22) Filed: Oct. 10, 2006

(65) Prior Publication Data
US 2007/0096745 A1 May 3, 2007

Related U.S. Application Data

(60) Provisional application No. 60/733,786, filed on Nov. 7, 2005.

(30) Foreign Application Priority Data

Oct. 11, 2005 (DE) .................. 10 2005 049 034

(51) Int. Cl.
G01F 23/00 (2006.01)
(52) U.S. Cl. .................... 73/290 R; 73/290 V
(58) Field of Classification Search .................. 73/644, 73/632, 584, 592, 625, 54.41, 19.03, 19.1, 73/53.04, 54.24, 54.25, 290 V
See application file for complete search history.

(56) References Cited

U.S. PATENT DOCUMENTS

| | | | | | |
|---|---|---|---|---|---|
| 4,173,886 | A | * | 11/1979 | Archbold et al. ........... 73/31.02 |
| 4,740,726 | A | * | 4/1988 | Umezawa ............... 310/316.01 |
| 5,295,120 | A | * | 3/1994 | McShane .................... 367/188 |
| 5,855,851 | A | * | 1/1999 | Matsubara et al. .......... 422/100 |
| 6,125,697 | A | * | 10/2000 | Holton et al. ................. 73/309 |
| 6,393,909 | B1 | * | 5/2002 | Fahrenbach et al. ....... 73/290 V |
| 6,805,384 | B1 | * | 10/2004 | Wiser ......................... 285/354 |
| 6,805,538 | B2 | | 10/2004 | Djordjevic | |

FOREIGN PATENT DOCUMENTS

| | | |
|---|---|---|
| DE | 37 34077 C2 | 4/1989 |
| DE | 689 01 828 T2 | 12/1992 |
| EP | 0 102 678 A2 | 3/1984 |
| FR | 1.531.962 | 7/1968 |
| JP | 2004125403 A | 4/2004 |
| WO | 98/28598 A1 | 7/1998 |
| WO | WO 98/28598 A1 | 7/1998 |

* cited by examiner

Primary Examiner—Hezron Williams
Assistant Examiner—Rodney T Frank
(74) Attorney, Agent, or Firm—Jerald L. Meyer; Derek Richmond; Stanley N. Protigal

(57) ABSTRACT

The invention relates to a filling level and/or limit level measuring device having
a transmitting and/or receiving device (2) for producing an oscillation or for receiving an oscillation and furnishing a corresponding reception signal,
an oscillating element (11) that is coupled to the transmitting and/or receiving device, and
a flexible connecting piece (8) that is situated in an area between the transmitting and/or receiving device (2) and the oscillating element (11),
wherein the flexible connecting piece (8) is made of a hose-shaped and metallic element (14) or has a hose-shaped metallic element (14) in its longitudinal extension.

10 Claims, 1 Drawing Sheet

FILLING LEVEL AND/OR LIMIT LEVEL MEASURING DEVICE WITH FLEXIBLE CONNECTING PIECE

This application claims benefit of U.S. Patent Application No. 60/773,786, filed Nov. 7, 2005, as a provisional application, the entire content of which is hereby incorporated by reference in its entirety.

FIELD OF THE INVENTION

The invention relates to a filling level and/or limit level measuring device with a flexible connecting piece. The measuring device has a transmitting and/or receiving device for producing an oscillation or for receiving an oscillation and furnishing a corresponding reception signal. The measuring device has an oscillating element that is coupled to the transmitting and/or receiving device, and a flexible connecting piece that is situated in an area between the transmitting and/or receiving device and the oscillating element. The flexible connecting piece is made of a hose-shaped and metallic element or has a hose-shaped metallic element in its longitudinal extension.

BACKGROUND

For registering limit levels a filling level and/or limit level measuring device with a flexible connecting piece is known, wherein a transmitting and/or receiving device is accommodated in a housing, there being an oscillating element attached to the transmitting and/or receiving device via a flexible connecting piece. The oscillating element together with the transmitting and/or receiving device forms an oscillator. The mechanical oscillations of the oscillating element are damped when bulk material is present. The oscillation damping therefore functions as an indicator of the presence of product at the measuring point, and is converted into a limit level reporting signal by means of a device connected down-line.

The flexible connecting piece is constructed in the nature of a cable made of a synthetic material. Up to now, however, such arrangements have had operating temperatures only up to a maximum of 160° C. The flexible connecting piece is usually connected to the transmitting and/or receiving device, an extension pipe or the oscillating element with a flange, a screw-in connector or other fitting as connecting device, with commercially available plastic hoses or special lines being used as the flexible connecting piece, which are for the most part provided with an internal supporting strand that is anchored below in the oscillating element and above in a fitting on the housing or extension pipe.

Such arrangements have a great many disadvantages. Some present cables with an internal wire rope are very stiff. Conductors or lines even for applications at high temperatures of 160° C. are generally positioned outside and are not protected further. The conductors of the flexible connecting piece lie or hang like a cable with the synthetic exterior jacket directly in the bulk material or medium of the container, and are subjected directly to abrasion or wear by the bulk material. In addition, sufficient conductivity of the outer jacket of the cable is not implementable or present with all synthetic materials. Such a cable made of PUR (polyurethane) is provided with a conductive outer jacket with a surface impedance of <$10^9$ ohms. A disadvantage is that it is not always possible to prevent kinking of a synthetic cable made in this way. A complex 100% conductive connection must be produced by means of a grounding wire with a fixed connection between the oscillating element and the attaching element by welding or screw connection. In addition, even then the lines are only of limited usability at higher temperatures, if they are moved when in the installed state and do not follow a fixed routing.

SUMMARY

The object of the invention is to improve a filling level and/or limit level measuring device with a flexible connecting piece, in particular to construct it in such a way that it is possible to use it for measuring the filling level or limit level of a medium in a container, even at high temperatures.

This object is attained using a filling level and/or limit level measuring device with a flexible connecting piece in which the measuring device has a transmitting and/or receiving device for producing an oscillation or for receiving an oscillation and furnishing a corresponding reception signal. The measuring device has an oscillating element that is coupled to the transmitting and/or receiving device, and a flexible connecting piece that is situated in an area between the transmitting and/or receiving device and the oscillating element. The flexible connecting piece is made of a hose-shaped and metallic element or has a hose-shaped metallic element in its longitudinal extension.

Preferred accordingly is a filling level and/or limit level measuring device having a transmitting and/or receiving device for producing an oscillation or receiving an oscillation and providing a corresponding reception signal, with an oscillating element that is arranged in an area between the transmitter and/or receiving device and the oscillating element for transmitting the oscillation therebetween, the flexible connecting piece being made from a hose-shaped and metallic element or having a hose-shaped and metallic element in its longitudinal extension.

Especially advantageous is a filling level and/or limit level measuring device in which the flexible connecting piece has a non-circular cross-section, whereby in addition to oval cross-sections in particular also cross-sections with corners in the form of e.g. rectangular hollow profiles for example can be implemented. In addition to hollow profiles, solid profiles may also be implemented, in which case it is useful for them to have only a small size.

Especially advantageous is a filling level and/or limit level measuring device in which the flexible connecting element has at the ends of its longitudinal extension a means of attachment for detachably attaching it to the transmitting and/or receiving device on the oscillating element and/or on extension pipes. The means of attachment, in combination with corresponding couplable attaching devices, preferably form a metal seal.

Especially advantageous is a filling level and/or limit level measuring device in which the metallic element is molded together with the means of attachment. The metallic element is preferably metallic or metal-containing braid, in particular of an electrically conductive material such as e.g. stainless steel.

In a different variant, the metallic element can be constructed as a metal protective sleeve. Such metal protective sleeves are described e.g. in DIN 49012. Such metal protective sleeves are sold for example by Hugro-Armaturen GmbH in Germany.

Especially advantageous is a filling level and/or limit level measuring device in which the metallic element is surrounded by a synthetic sleeve or a synthetic fabric, and/or in which the metallic element surrounds a hose-shaped synthetic element or a hose-shaped synthetic fabric.

Especially advantageous is a filling level and/or limit level measuring device made of materials that enable use at temperatures greater than 100° C., in particular greater than 160° C.

Such a filling level and/or limit level measuring device with a flexible connecting piece solves the many existing problems in an advantageous way, according to current experiments.

What is made possible in particular is use e.g. as an oscillating limit level measuring device at temperatures of up to 260° C. or possibly even more for registering limit levels in bulk materials with a movable suspended oscillating element in the nature of a cable version of the flexible connecting piece which is now made with a metallic element. In general, for the present purposes, oscillations are also to be understood as vibrations and vice versa.

With a known cable version there was always a problem with procuring the appropriate special lines in small quantities, since this involved high costs or large minimum quantities. Until now, this was always a deterrent to undertaking further developments in terms of high temperature models of cable versions. These problems have now been completely circumvented by providing a flexible and in particular at the same time tight pipe connection between the connecting device and the oscillating element, which is made possible in the case of e.g. a vibrating limit switch by a high temperature synthetic hose covered by stainless steel wire braid as the flexible connecting piece. Other combinations of materials can also be used, however.

The connections of the connecting piece with the connecting device, an extension pipe and the oscillating element is [sic] preferably implemented as metal sealing threaded connections, but depending on need can also be bolted with an O-ring seal or welded. Simple high temperature hoses surrounded by a stainless steel wire braid are advantageously available commercially and can be used up to the usage limit of high-temperature synthetics contained therein that are used for an inner or outer hose. In the case of a PTFE inner hose up to e.g. 260° C. By producing an absolutely tightly sealed high temperature-suitable pipe connection or hose connection between the oscillating element and the connecting device, it is now possible to pass standard lines, stranded wires, hoses and other connecting and drive lines through the highly flexible connection between the oscillating element and the connecting device.

A stainless steel wire braid as the central material of the connecting piece offers a number of advantages. For one thing, it creates tension relief, in particular if it is pressed into the screwed connection with positive fit. In addition, it is used as a 100% conductive connection between the oscillating element and the connecting device. Furthermore, it also functions indirectly as a shield. In addition, it prevents kinking of the pipe or hose of the connecting piece and of the lines running in the pipe or hose. It prevents wear or abrasion of the synthetic cable by the bulk material. Because of the fine wire braid, and in particular because it is on the outside, connecting pieces constructed in this way are also more flexible than many cables with an internal wire rope. As an alternative, the wire braid can also be covered by a high temperature synthetic hose running on the outside, in order to prevent deposits of product. Combinations with a pipe extension and an attached flexible connecting piece of this sort can be implemented advantageously.

BRIEF DESCRIPTION OF THE DRAWING

An exemplary embodiment will now be explained in greater detail on the basis of the drawing. The FIGURE shows the following.

DETAILED DESCRIPTION

Figure 1:
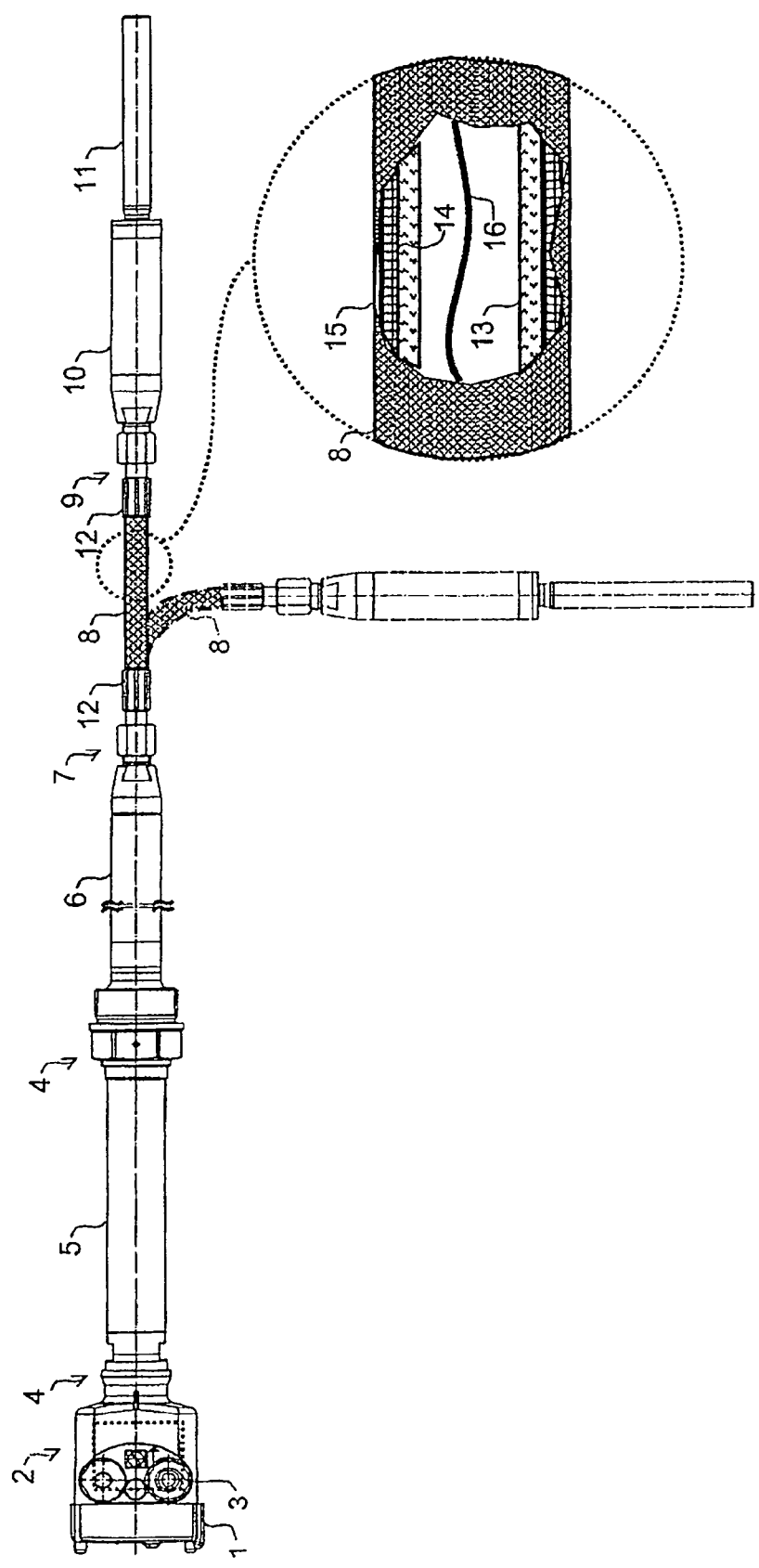
FIG. 1: a filling level and/or limit level switch with a flexible connecting piece in two exemplary operating positions of the flexible connecting piece.

As can be seen in FIG. 1, a preferred filling level and/or limit level measuring device is made up of a number of components that can be combined with each other. The components can be combined appropriately depending on the intended application, and can be exchanged as necessary for other similar components. Other similar components may be necessary for example for special container types, bulk materials or filling media in the containers. Similar components with other physical parameters or for special electronic applications may also be used.

In the illustrated embodiment, a transmitting and receiving device 2 that is accessible by means of an external control device via connections 3 is contained in a housing 1. Transmitting and receiving device 2 includes electronic and/or electromechanical components for producing an oscillation or vibration that is to be emitted into a container as a transmission signal. In addition, transmitting and receiving device 2 contains components for receiving and registering an oscillation or vibration transmitted from the container, in order to emit a corresponding reception signal or a processed and evaluated filling signal to the external device via the connections 3. Optionally, housing 1 can also contain only a pure transmitting device or only a pure receiving device, for example if the transmitter and receiver of oscillations are situated separately from each other in the container.

A connecting device 4, for example a flange, to be coupled with a screw-in connector or other fitting, is situated on housing 1 transmitting and receiving device 2. Connected to connecting device 4 is an extension pipe 5, to which an additional extension pipe 6 is attached via an additional connecting device 4. Situated on the face of additional extension pipe 6 is an attaching device 7 that in turn is preferably constructed in the form of a flange or a screw-in connector. Attached to attaching device 7 is a flexible connecting piece 8. At the other end of flexible connecting piece 8, an oscillating element connecting part 10 that includes an oscillating element 11 is attached via an additional attaching device 9.

The additional attaching device 9, like the attaching device 7 and the connecting devices 4, is preferably in the form of a flange or a screw-in connector in the nature of a detachable attachment, so that the individual components may be exchanged or are combined with other necessary corresponding components as needed.

The individual extension pipes 5, 6, the connecting devices 4, the attaching devices 7, 9, the flexible connecting piece 8 and the oscillating element connecting part 10 are designed so that an oscillation of transmitting and receiving device 2 can be transmitted to oscillating element 11 and can be radiated from oscillating element 11 into the space of the container. In addition, oscillating element 11 can transmit oscillations picked up from the surroundings or from the container in the opposite direction to the transmitting and receiving device 2.

Such a filling level and/or limit level measuring device is made advantageous by the special design of the flexible connecting piece, as can be seen from the enlarged detail in FIG. 1. Exemplary flexible connecting piece 8 comprises a central hose-shaped element 13 made of a preferably electrically insulating synthetic material. Element 13 can be made e.g. of PTFE (polytetrafluoroethylene). If necessary, wire ropes, cables and the like can be run inside of central hose-shaped element 13 as internal elements 16.

Central hose-shaped element 13 is surrounded by a flexible hose-shaped and metallic element 14 that is preferably constructed in the nature of a metallic braid or a metal protective sleeve. Stainless steel is the especially preferred material for use, in order to offer both great robustness against mechanical influences and very good electrical conductivity for transmitting the electromagnetic oscillations.

Preferably, hose-shaped and metallic element 14 is effectively surrounded by a closed or segmented synthetic jacket 15 as an additional hose-shaped element and as a protective cover.

The essential element of flexible connecting piece 8 is the hose-shaped and metallic element 14. The other elements offer additional benefits, depending on the conceivable application, but they can also be omitted if appropriate. The hose-shaped and metallic element 14, like most of the other components of the flexible connecting piece 8, extends through the latter in the longitudinal or oscillation-conducting direction of the flexible connecting piece 8.

On the outside, the flexible connecting piece 8 has means of attachment 12 on both of its end sections, and its function is to form a connection to the attaching devices 7, 9 that is highly conductive for the oscillations and at the same time mechanically strong, in particular by screwing or welding.

Using the stainless steel wire braid with internal hollow hose made of high temperature synthetic such as e.g. PTFE, PFA, necessary drive lines can be run without problem as the internally situated elements 16 to oscillating element 11. Depending on need, other supply lines can also be run from connecting device 4 to oscillating element 11 and vice versa, since this is preferably a pressure-tight hose connection between connecting device 4 and oscillating element 11. Flexible connecting piece 8 can also be constructed of combinations of materials other than stainless steel and synthetic material.

What is presented is merely an exemplary filling level/limit level measuring device, which also has in addition an optional solid pipe section made up of a plurality of connecting pipes 5, 6, for a flexible feed to oscillating element 11 in the form of connecting piece 8.

That enables the measuring device to be routed through a solid pipe line to a certain point, and only then to be continued flexibly to oscillating element 11.

What is claimed is:

1. Filling level and/or limit level measuring device having
   a transmitting and/or receiving device for producing an oscillation or for receiving an oscillation and furnishing a corresponding reception signal,
   an oscillating element that is coupled to the transmitting and/or receiving device, and
   a flexible connecting piece that is situated in an area between the transmitting and/or receiving device and the oscillating element, characterized in that
   the flexible connecting piece is made of a high temperature synthetic hose covered by a metallic braid.

2. The filling level and/or limit level measuring device according to claim 1, wherein the flexible connecting piece has a non-circular cross-section.

3. The filling level and/or limit level measuring device according to claim 1, wherein the flexible connecting element has in its longitudinal extension means of attachment at its ends, for detachable attachment to the transmitting and/or receiving device, to the oscillating element and/or to extension pipes.

4. The filling level and/or limit level measuring device according to claim 1, wherein the flexible connecting element includes means of attachment, in combination with corresponding attaching devices to be coupled, form a metal seal.

5. The filling level and/or limit level measuring device according to claim 4, wherein the metallic braid is pressed together with the means of attachment.

6. The filling level and/or limit level measuring device according to claim 1, wherein the metallic braid is formed of stainless steel.

7. The filling level and/or limit level measuring device according to claim 1, wherein the metallic braid is a metal protective hose.

8. The filling level and/or limit level measuring device according to claim 1, wherein the braid is surrounded by a synthetic jacket or a synthetic fabric.

9. The filling level and/or limit level measuring device according to claim 1, made of materials that enable use at temperatures greater than 100° C.

10. The filling level and/or limit level measuring device according to claim 1, made of materials that enable use at temperatures greater than 160° C.

\* \* \* \* \*